United States Patent
Hasegawa et al.

(10) Patent No.: US 6,692,977 B2
(45) Date of Patent: Feb. 17, 2004

(54) METHOD FOR MANUFACTURING MAGNETIC HEAD

(75) Inventors: Minoru Hasegawa, Kawasaki (JP); Yoshinori Ohtsuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/341,016

(22) Filed: Jan. 13, 2003

(65) Prior Publication Data
US 2003/0136757 A1 Jul. 24, 2003

(30) Foreign Application Priority Data
Jan. 16, 2002 (JP) ......................................... 2002-007561

(51) Int. Cl.$^7$ ............................................. H01L 21/00
(52) U.S. Cl. ............................ 438/3; 438/104; 438/950
(58) Field of Search ............................. 438/3, 48, 104, 438/381, 950

(56) References Cited

U.S. PATENT DOCUMENTS

| | | | |
|---|---|---|---|
| 6,180,421 B1 * | 1/2001 | Futai et al. | 438/3 |
| 6,329,211 B1 * | 12/2001 | Terunuma et al. | 438/3 |
| 6,534,410 B2 * | 3/2003 | Tsutsui | 438/780 |
| 2001/0055879 A1 * | 12/2001 | Sasaki | 438/689 |

FOREIGN PATENT DOCUMENTS

JP 07-311912 11/1995

* cited by examiner

Primary Examiner—Chandra Chaudhari
(74) Attorney, Agent, or Firm—Greer, Burns & Crain, Ltd.

(57) ABSTRACT

A method is provided for manufacturing a magnetic head for recording information on a magnetic recording medium in the form of a direction of magnetization, which enables manufacture of a magnetic head with gaps between turns of a conductive material constituting a coil being filled with an insulating material without any void and heat generation in the coil being suppressed. A photoresist with a higher flowability than an insulating material containing a metal element is applied to the coil. A part of the photoresist applied to the coil which covers the conductive material constituting the coil is removed by exposure and development, and on the conductive material, an insulating metal compound layer made of an insulating material containing a metal element and having a higher thermal conductivity than the photoresist is formed and polished for flattening.

5 Claims, 11 Drawing Sheets

METHOD FOR MANUFACTURING MAGNETIC HEAD

BACKGROUND OF THE INVENTION

1. Field of the Invention

The present invention relates to a method for manufacturing a magnetic head for recording information on a magnetic recording medium in the form of a direction of magnetization.

2. Description of the Related Art

In recent years, as computers have become popular, a large quantity of information has become dealt with in daily life. Such information is recorded on a recording medium in the form of a large number of physical marks by an information recording/regeneration apparatus, and the recorded information is regenerated by the information recording/regeneration apparatus reading the marks on the recording medium and generating electrical regeneration signals.

One of the information recording/regeneration apparatus is a hard disk drive (HDD), which is characterized by its large storage capacity and high access speed to information. In general, the HDD comprises a magnetic disk with a surface made of a magnetic material, which constitutes a recording medium, and a magnetic head for recording information in the magnetic disk or regenerating the information recorded in the magnetic disk.

The surface of the magnetic disk is magnetized on a small region (1-bit region) basis, and 1 bit of information is recorded in a 1-bit region in the form of a direction of magnetization.

In general, the magnetic head has a coil shaped like a thin film and is disposed close to the magnetic disk. A current is supplied to the coil in the magnetic head to generate a magnetic field, and the magnetic field is leaked to the outside. The leaked magnetic field causes magnetization of each small region of the magnetic disk, whereby the information is recorded in the magnetic disk.

The surface recording density of the magnetic disk increases from year to year, and accordingly, the magnetic head becomes required to have a higher information recording performance. For example, it is required to increase a recording frequency to further increase an information transfer rate in recording information in the magnetic disk by the magnetic head. In order to attain such an increased transfer rate, a distance between turns of a conductive material constituting the coil in the magnetic head is preferably reduced to reduce a length of a yoke portion, that is, a portion between a recording gap and a connected portion (back gap) between an upper magnetic pole and a lower magnetic pole. Thus, a time lag between the generation of the magnetic field in the coil and the recording of the information in the magnetic disk is reduced, whereby a high frequency recording can be accomplished.

On the coil in the magnetic head, an overcoat layer made of an insulating material containing a metal element, such as alumina ($Al_2O_3$), is formed by sputtering, evaporation or the like to prevent a current leakage.

Now, in a process for manufacturing the magnetic head, a step of forming the overcoat layer made of $Al_2O_3$ on the coil by sputtering will be described by referring to FIG. 16.

Part (a) of FIG. 16 is a cross-sectional view of a part of the coil in the magnetic head, and part (b) of FIG. 16 is a cross-sectional view of the same after the overcoat layer made of $Al_2O_3$ is formed on the coil shown in part (a) of FIG. 16.

In a step of forming the coil shown in part (a) of FIG. 16, a spiral coil 70 made of Cu is formed on an insulating layer (not shown) by plating.

In a step of forming the coil shown in part (b) of FIG. 16, an overcoat layer 81 made of $Al_2O_3$ is formed by sputtering on the coil 70 formed in the step shown in part (a) of FIG. 16.

As described above, if the distance between turns of the copper wire constituting the coil 70 is reduced to reduce the length of the magnetic pole yoke for a higher write rate in the recording of the information in the magnetic disk by the magnetic head, it becomes difficult to completely fill gaps between the turns of the copper wire with $Al_2O_3$, and thus, a void 82 may occur as shown in part (b) of FIG. 16. If such a void 82 occurs, the coil 70 is corroded (oxidized) and an electrical resistance thereof increases, which may cause an increase of the voltage applied to the coil, increase of heat generation in the coil, for example.

Thus, there is known a technique of applying, to a coil, a photoresist, which is a kind of insulating material which has a higher flowability than the insulating material containing a metal element, such as $Al_2O_3$, and subjecting the photoresist to a thermal treatment or UV (ultraviolet) treatment to cure the photoresist, thereby forming a photoresist layer on the coil.

FIG. 17 is a cross-sectional view of a conventional magnetic head having gaps between turns of the conductive material constituting a coil filled with a photoresist.

The magnetic head shown in FIG. 17 is a combined magnetic head 32 composed of a regenerating head 10 and a recording head 90.

The regenerating head 10 of the combined magnetic head 32 comprises an element portion 11, a regenerating lower shield 12 and a regenerating upper shield 13 disposed to sandwich the element portion 11 from both sides thereof in a thickness direction, and a regenerating gap layer 14 disposed to fill a space between the regenerating lower shield 12 and the regenerating upper shield 13 and sandwich the element portion 11 from both sides thereof in the thickness direction.

The regenerating upper shield 13 of the regenerating head 10 serves also as a lower magnetic pole of a recording head 90 described later. Therefore, in the following description, the lower magnetic pole is assigned the same reference numeral 13 as the regenerating upper shield 13, and referred to as a lower magnetic pole 13.

The recording head 90 of the combined magnetic head 32 comprises the lower magnetic pole 13, a lower tip secondary magnetic pole 91a and a back gap 91b formed on the lower magnetic pole 13, an insulating layer 92 also formed on the lower magnetic pole 13, a lower coil 93 formed on the insulating layer 92, a lower photoresist coat layer 94 formed to cover the lower coil 93, a lower overcoat layer 95 formed on the lower photoresist coat layer 94, and a recording gap layer 96 formed on the lower overcoat layer 95 and the lower tip secondary magnetic pole 91a. In addition, the recording head 90 has two layers of coils and further comprises an upper coil 97 formed on the recording gap layer 96, an upper photoresist coat layer 98 formed on the upper coil 97, and an upper magnetic pole 99 formed on the upper photoresist coat layer 98 and the recording gap layer 96.

The lower magnetic pole 13 and the upper magnetic pole 99 are connected to each other by the back gap 91b disposed at the center of the lower coil 93 and the upper coil 97 and form a magnetic circuit surrounding the lower coil 93 and the upper coil 97. The magnetic field generated by the lower coil 93 and the upper coil 97 passes through the lower magnetic pole 13 and the upper magnetic pole 99 and is leaked to the outside via the lower tip secondary magnetic pole 91a formed on the lower magnetic pole 13 and the upper magnetic pole 99. The lower tip secondary magnetic pole 91a and the upper magnetic pole 99 each face the magnetic disk, not shown, and the magnetic field leaked to the outside causes the magnetization of each small region of the magnetic disk to be inverted.

With the combined magnetic head 32 shown in FIG. 17, as described above, the photoresist, which is a kind of insulating material, has a higher flowability than the insulating materials containing a metal element. Therefore, the spaces between the turns of the conductive material constituting the coil can be filled with the photoresist without any void, and the problem that the electrical resistance of the coil is increased due to the corrosion of the coil can be avoided.

Comparing the photoresist with the insulating material containing a metal element, however, the photoresist generally has a lower thermal conductivity than the insulating material containing a metal element. For example, the thermal conductivity of the photoresist is about one-tenth of that of $Al_2O_3$, which is one of insulating materials containing a metal element. Therefore, with the magnetic head with the photoresist layer formed to cover the coil, a heat generated in the coil when a current is passed therethrough is hard to release, and thus, a trouble with the coil due to the heat generation, such as oxidization and break thereof, is likely to occur.

SUMMARY OF THE INVENTION

In view of the circumstances described above, an object of the present invention is to provide a method for manufacturing a magnetic head that enables manufacture of a magnetic head with gaps between turns of a conductive material constituting a coil being filled with an insulating material without any void and heat generation in the coil being suppressed.

In order to attain the object, a method for manufacturing a magnetic head according to the present invention comprises:

a coil forming step of forming a spiral coil made of a conductive material on a predetermined plane;

a resist applying step of applying a photoresist to whole of the coil formed in the coil forming step to fill a gap between turns of a conductive material constituting the coil with the photoresist;

an exposure step of exposing to light a part of the photoresist applied in the resist applying step which covers the conductive material constituting the coil formed in the coil forming step;

a development step of subjecting the photoresist exposed to light in the exposure step to development to remove the part of the photoresist applied in the resist applying step which is exposed to light in the exposure step;

a resist curing step of curing the photoresist remaining after the development in the development step; and an insulating metal compound layer forming step of forming an insulating metal compound layer made of an insulating material containing a metal element on the photoresist cured in the resist curing step and the coil formed in the coil forming step.

In the method for manufacturing a magnetic head according to the present invention, the photoresist with a higher flowability than the insulating material containing a metal element is applied to the coil, and therefore, the gap between turns of the conductive material constituting the coil can be filled with the photoresist, which is a kind of insulating material, without any void.

In the method for manufacturing a magnetic head according to the present invention, the part of the photoresist applied to the coil which covers the conductive material constituting the coil is removed by exposure and development, and the insulating metal compound layer, which is made of an insulating material containing a metal element and having a higher thermal conductivity than the photoresist, is formed on the conductive material. Thus, heat generated in the coil is released via the insulating metal compound layer in contact with the coil. Therefore, heat generation in the coil can be suppressed.

In the method for manufacturing a magnetic head according to the present invention, the exposure step may be to expose to light a part of the photoresist applied in the resist applying step which fills the gap between the turns of the conductive material constituting the coil formed in the coil forming step, instead of to expose to light the part of the photoresist applied in the resist applying step which covers the conductive material constituting the coil, and the development step may be to remove a part of the photoresist applied in the resist applying step which is not exposed to light in the exposure step, in stead of to remove the part of the photoresist applied in the resist applying step which is exposed to light in the exposure step.

In general, the photoresist is known to include a so-called positive photoresist, a part of which exposed to light is removed by development, and a so-called negative photoresist, a part of which not exposed to light is removed by development. In the method for manufacturing a magnetic head according to the present invention, either the positive photoresist or negative photoresist can be used. Also in the method for manufacturing a magnetic head using the negative photoresist, the part of the photoresist covering the conductive material constituting the coil can be removed by exposure and development as in the method for manufacturing a magnetic head using the positive photoresist described above.

Furthermore, the method for manufacturing a magnetic head according to the present invention preferably further comprises a small quantity exposure step before or after the exposure step, in which whole of the photoresist applied in the resist applying step is exposed to light with a light exposure lower than that in the exposure step.

With the method for manufacturing a magnetic head including the small quantity exposure step, the part of photoresist which fills the gap between the turns of conductive material constituting the coil and is not exposed to light in the exposure step is exposed to light with a low light exposure, and the thickness of the entire photoresist is reduced in the development step depending on the light exposure. Thus, the thickness of the photoresist can be brought close to the thickness of the coil by adjusting the light exposure in the small quantity exposure step.

As a result, in the subsequent insulating metal compound layer forming step, the insulating metal compound layer made of an insulating material containing a metal element can be formed on the coil without any void with higher reliability, and thus, a magnetic head can be provided in which the heat generated in the coil is readily released and heat generation in the coil is further suppressed.

The method for manufacturing a magnetic head according to the present invention preferably further comprises a dry-etching step before or after the resist curing step, in which whole of the photoresist applied in the resist applying step is subjected to dry-etching.

With the method for manufacturing a magnetic head including the dry-etching step, the thickness of the photoresist is reduced depending on the amount of the etching performed on the photoresist remaining after the development. Thus, by adjusting the amount of the etching, the thickness of the photoresist filling the gaps between the turns of the conductive material constituting the coil can be adjusted and the thickness of the photoresist can be brought close to the thickness of the coil.

As a result, as in the method for manufacturing a magnetic head including the small quantity exposure step, the insulating metal compound layer can be formed on the coil without any void with higher reliability, and a magnetic head with heat generation in the coil being further suppressed can be provided.

The method for manufacturing a magnetic head according to the present invention may further comprises a polishing step of polishing and flattening the insulating metal compound layer formed in the insulating metal compound layer forming step.

With the method for manufacturing a magnetic head including the polishing step, the insulating metal compound layer can be flattened by a polishing method, such as chemical and mechanical polishing (CMP). For example, a magnetic pole layer with a fine pattern can be formed precisely on a surface of the flattened insulating metal compound layer.

DETAILED DESCRIPTION OF THE PREFERRED EMBODIMENTS

Now, embodiments of the present invention will be described.

The present invention relates to a method for manufacturing a magnetic head. However, a magnetic head manufactured by one embodiment of the method for manufacturing a magnetic head according to the present invention will be first described, and then, the embodiments of the method for manufacturing a magnetic head according to the present invention will be described.

First, a hard disk drive incorporating a magnetic head manufactured by a first embodiment of the method for manufacturing a magnetic head according to the present invention, described later, will be described.

Figure 1:
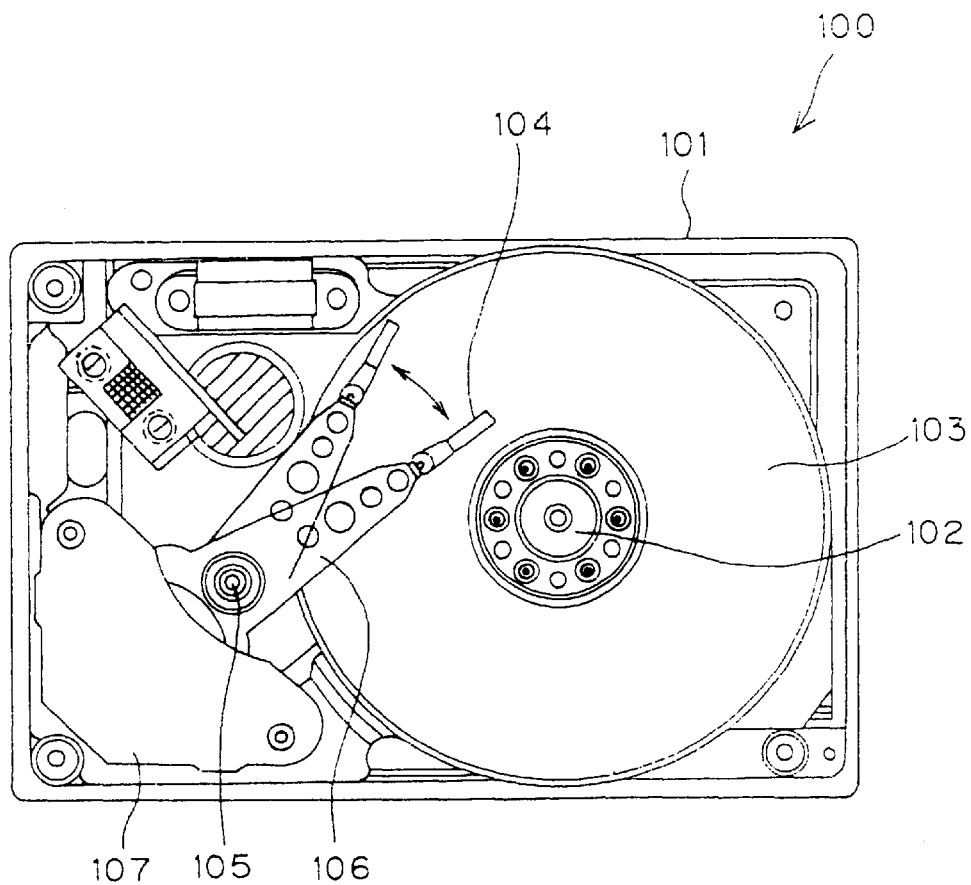
FIG. 1 is a schematic diagram showing a hard disk drive.

FIG. 1 is a schematic diagram showing the hard disk drive.

A housing 101 of the hard disk drive (HDD) 100 shown in FIG. 1 houses a rotary shaft 102, a magnetic disk 103 mounted on the rotary shaft 102, a floating head slider 104 facing a surface of the magnetic disk 103 closely, an arm shaft 105, a carriage arm 106 that has the floating head slider 104 fixed to a tip thereof and pivots horizontally about the arm shaft 105 over the magnetic disk 103, and an actuator 107 for causing the carriage arm 106 to pivot horizontally.

In the HDD 100, information is recorded in the magnetic disk 103 and the information recorded in the magnetic disk 103 is regenerated. In such recording and regeneration of information, the actuator 107, which is composed of a magnetic circuit, first actuates the carriage arm 106, thereby positioning the floating head slider 104 above a desired track on the rotating magnetic disk 103. On a tip of the floating head slider 104, a combined magnetic head composed of a recording head and a regenerating head (not shown in FIG. 1) is mounted. As the magnetic disk 103 rotates, the combined magnetic head is successively brought near to 1-bit regions in the track of the magnetic disk 103. When recording information, an electrical recording signal is input to the combined magnetic head near the magnetic disk 103, and the recording head of the combined magnetic head applies a magnetic field associated with the recording signal to each 1-bit region, whereby the information carried on the recording signal is recorded in the 1-bit region in the form of a direction of magnetization. When regenerating information, the information recorded in each 1-bit region in the form of a direction of magnetization is extracted by the regenerating head of the combined magnetic head in the form of an electrical regeneration signal generated responsively to a signal magnetic field $H_{sig}$ generated by the magnetization. An interior space of the housing 101 is enclosed by a cover, not shown. The recording head of the combined magnetic head is manufactured by the first embodiment of the method for manufacturing a magnetic head according to the present invention described later.

Figure 2:
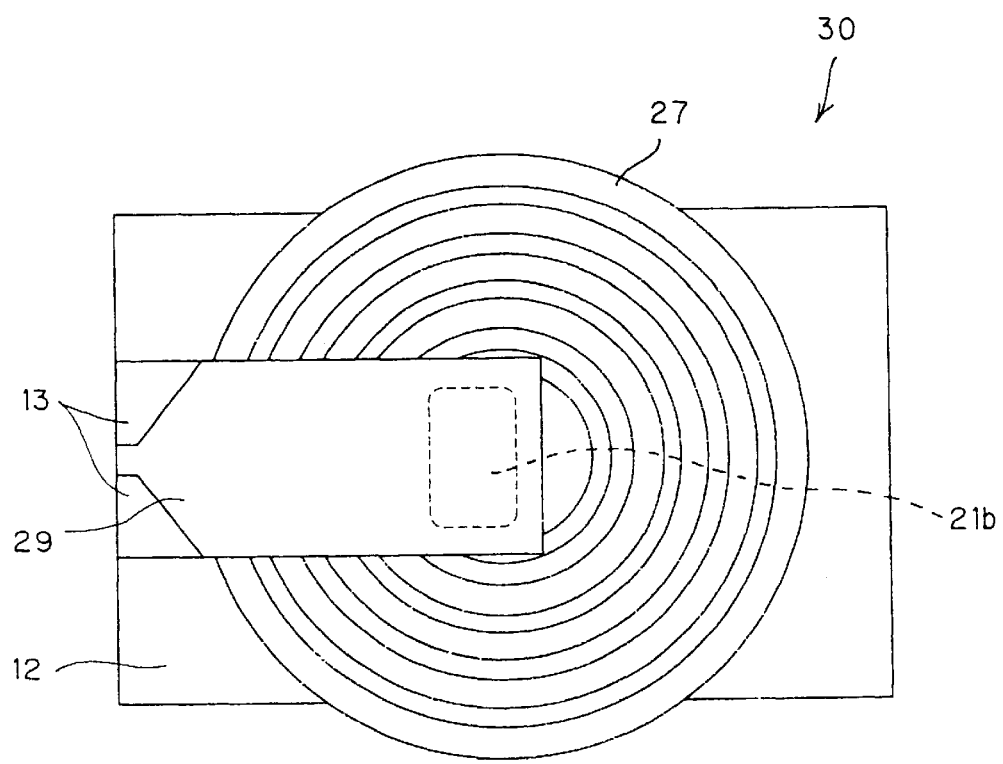
FIG. 2 is a top view of a combined magnetic head included in the HDD shown in FIG. 1 which has a recording head manufactured by a first embodiment of a method for manufacturing a magnetic head according to the present invention.
Figure 3:
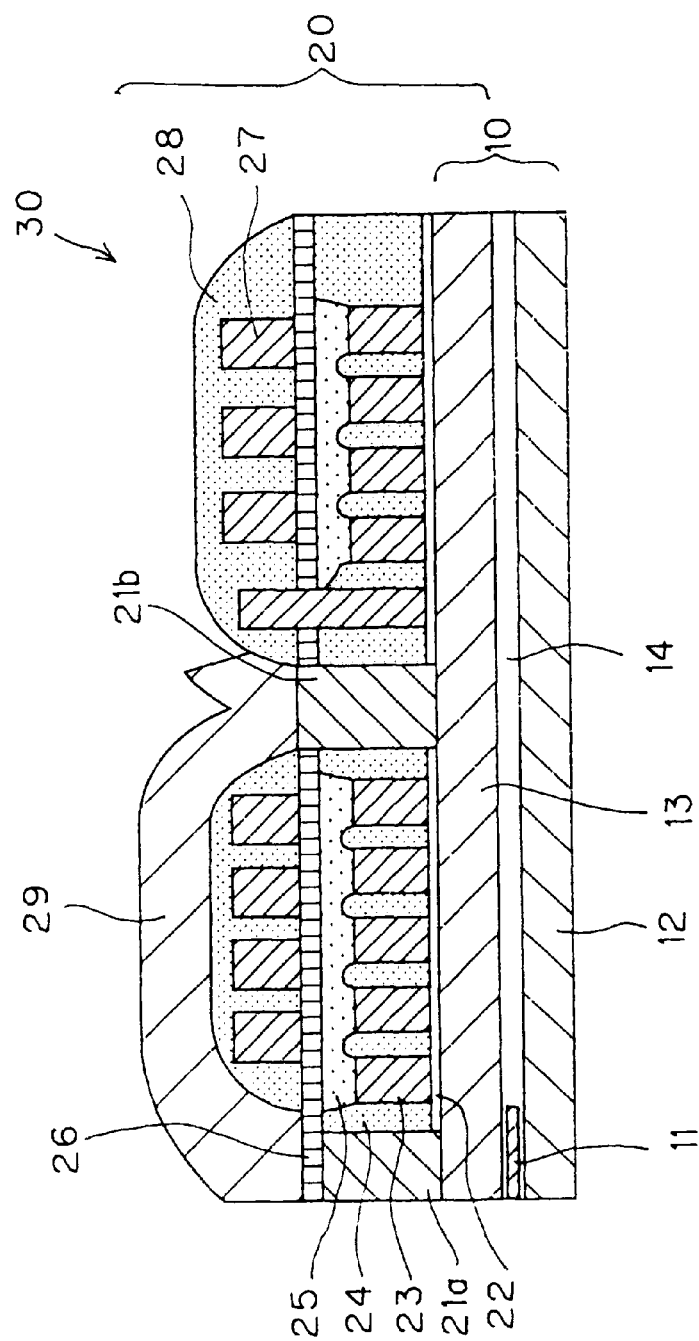
FIG. 3 is a cross-sectional view of the combined magnetic head shown in FIG. 2.

FIG. 2 is a top view of the combined magnetic head included in the HDD 100 shown in FIG. 1 which has the recording head manufactured by the first embodiment of the method for manufacturing a magnetic head according to the present invention, and FIG. 3 is a cross-sectional view of the combined magnetic head shown in FIG. 2.

A combined magnetic head 30 shown in FIGS. 2 and 3 is positioned close to the surface of the magnetic disk 103 shown in FIG. 1.

As described above, the magnetic head 30 shown in FIGS. 2 and 3 comprises a recording head 20 and a regenerating head 10. Now, configurations of the recording head 20 and regenerating head 10 will be each described.

The regenerating head 10 of the combined magnetic head 30 comprises an element portion 11 including a magnetoresistive film, an electrode film or the like that receives a magnetic field from the magnetic disk 103 shown in FIG. 1 and generates a regeneration signal responsive to the magnetic field, a regenerating lower shield 12 and a regenerating upper shield 13 made of NiFe and disposed to sandwich the element portion 11 from both sides thereof in a thickness direction, and a regenerating gap layer 14 made of $Al_2O_3$ (alumina) and disposed to fill a space between the regenerating lower shield 12 and the regenerating upper shield 13 and sandwich the element portion 11 from both sides thereof in the thickness direction.

The regenerating upper shield 13 of the regenerating head 10 serves also as a lower magnetic pole of a recording head 20 described later. Therefore, in the following description, the lower magnetic pole is assigned the same reference numeral 13 as the regenerating upper shield 13, and referred to as a lower magnetic pole 13.

The recording head 20 of the combined magnetic head 30 comprises the lower magnetic pole 13, a lower tip secondary magnetic pole 21a and a back gap 21b made of NiFe and formed on the lower magnetic pole 13, an insulating layer 22 made of $Al_2O_3$ and also formed on the lower magnetic pole 13, a lower coil 23 made of Cu and formed on the insulating layer 22, a lower photoresist coat layer 24 made of a photoresist and filling gaps between turns of the Cu wire constituting the lower coil 23, a lower overcoat layer 25 made of $Al_2O_3$ and formed on the lower coil 23 and the lower photoresist coat layer 24, and a recording gap layer 26 made of $Al_2O_3$ and formed on the lower overcoat layer 25 and the lower tip secondary magnetic pole 21a. In addition, the recording head 20 has two layers of coils and further comprises an upper coil 27 made of Cu and formed on the recording gap layer 26, an upper photoresist coat layer 28 made of a photoresist and formed on the upper coil 27, and an upper magnetic pole 29 made of NiFe and formed on the upper photoresist coat layer 28 and the recording gap layer 26.

The lower magnetic pole 13 and the upper magnetic pole 29 are connected to each other by the back gap 21b disposed at the center of the lower coil 23 and the upper coil 27, as shown in FIG. 2, and form a magnetic circuit surrounding the lower coil 23 and the upper coil 27. The magnetic field generated by the lower coil 23 and the upper coil 27 passes through the lower magnetic pole 13 and the upper magnetic pole 29 and is leaked to the outside via the lower tip secondary magnetic pole 21a formed on the lower magnetic pole 13 and the upper magnetic pole 29. The lower tip secondary magnetic pole 21a and the upper magnetic pole 29 each face the magnetic disk 103 shown in FIG. 1, and the magnetic field leaked to the outside causes the magnetization of each small region of the magnetic disk 103 to be inverted.

The material constituting the regenerating lower shield 12, the regenerating upper shield 13, the lower magnetic pole 13, the lower tip secondary magnetic pole 21a, the back gap 21b and the upper magnetic pole 29 is not limited to NiFe described above. For example, any soft magnetic material, such as CoNiFe and FeZrN, can be used. Furthermore, the material constituting the lower coil 23 and the upper coil 27 is not limited to Cu described above, a conductive material other than Cu can be used. Furthermore, the material constituting the lower overcoat layer 25 is not limited to $Al_2O_3$ described above, an insulating material other than $Al_2O_3$ can be used.

Now, a method for manufacturing the recording head 20 of the combined magnetic head 30 described above will be described with reference to FIGS. 4 to 10.

The method for manufacturing the recording head 20 described below is the first embodiment of the method for manufacturing a magnetic head according to the present invention.

Figure 4:
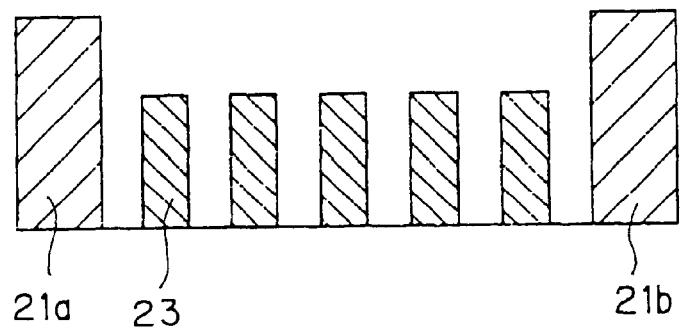
FIG. 4 illustrates a first step in a method for manufacturing a recording head 20.

FIG. 4 illustrates a first step in the method for manufacturing the recording head 20.

In the first step shown in FIG. 4, the lower tip secondary magnetic pole 21a and the back gap 21b made of NiFe are formed on the lower magnetic pole 13 (not shown, see FIG. 3) by plating. Then, the spiral lower coil 23 made of Cu is formed on the insulating layer 22 (not shown, see FIG. 3) also by plating. In the first step, the sub-step of forming the lower coil 23 is one example of a coil forming step according to the present invention.

Figure 5:
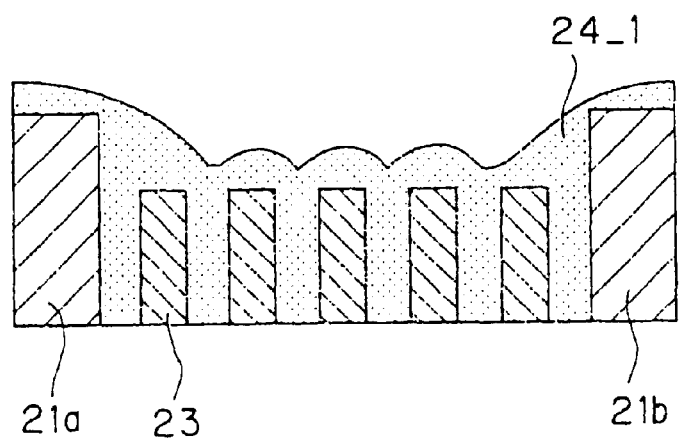
FIG. 5 illustrates a second step in the method for manufacturing the recording head 20.

FIG. 5 illustrates a second step in the method for manufacturing the recording head 20.

In the second step shown in FIG. 5, a photoresist 24_1 is applied to cover the whole of the lower tip secondary magnetic pole 21a, the back gap 21b and the lower coil 23 including top portions thereof formed in the first step shown in FIG. 4, thereby filling the gaps between the turns of the Cu wire constituting the lower coil 23 with the photoresist 24_1. The second step is one example of a resist applying step according to the present invention.

With the second step, since the photoresist 24_1 which has a high flowability is applied to the lower coil 23, the gaps between the turns of the Cu wire constituting the lower coil 23 can be filled with the photoresist 24_1 without any void.

Figure 6:
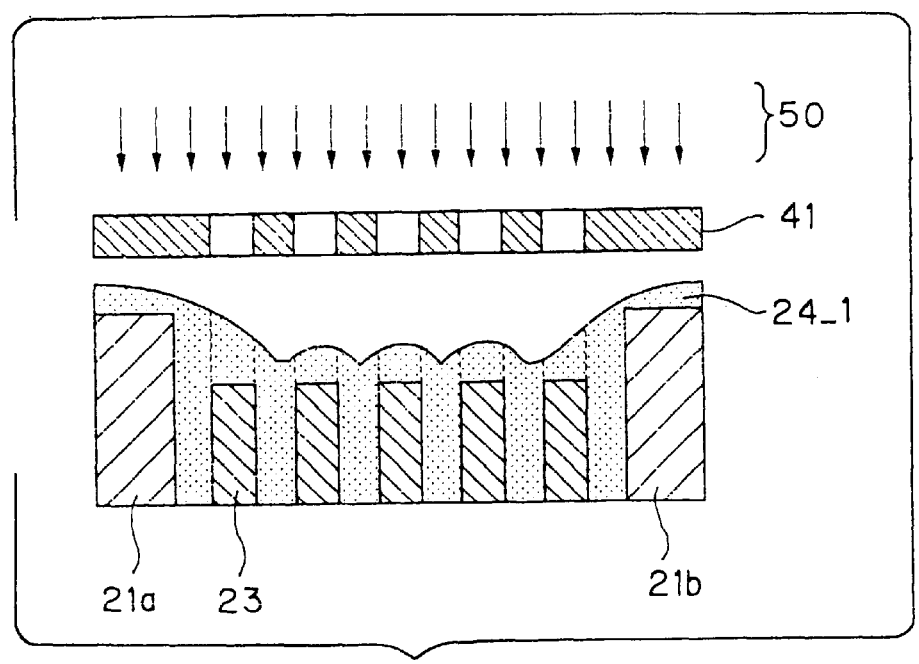
FIG. 6 illustrates a third step in the method for manufacturing the recording head 20.

FIG. 6 illustrates a third step in the method for manufacturing the recording head 20.

In the third step shown in FIG. 6, the photoresist 24_1 covering the Cu wire constituting the lower coil 23 is exposed to ultraviolet rays 50 via a mask 41 which is configured to shield against light the photoresist 24_1 applied in the second step shown in FIG. 5 except for a part covering the Cu wire constituting the lower coil 23 formed in the first step shown in FIG. 4. The third step is one example of an exposure step according to the present invention.

Figure 7:
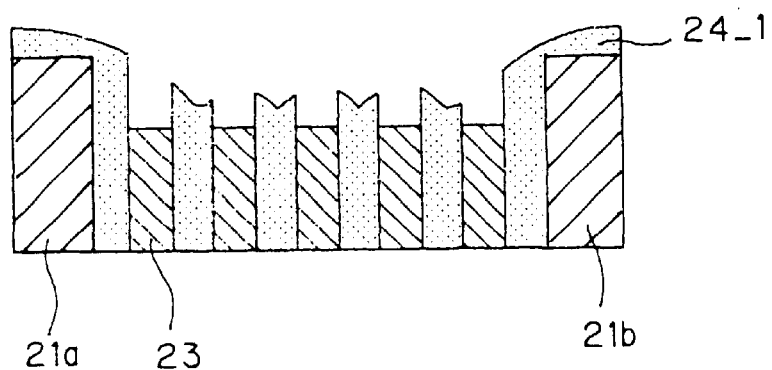
FIG. 7 illustrates a fourth step in the method for manufacturing the recording head 20.

FIG. 7 illustrates a fourth step in the method for manufacturing the recording head 20.

In the fourth step shown in FIG. 7, the photoresist 24_1 after exposure in the third step shown in FIG. 6 is subjected to development using an alkali solution, thereby removing the part of the photoresist applied in the second step shown in FIG. 5 which is exposed to light in the third step. The fourth step is one example of a development step according to the present invention.

With the exposure and development in the third and fourth steps, the part of the photoresist 24_1 applied to cover the lower coil 23 which covers the Cu wire constituting the lower coil 23 is surely removed.

Figure 8:
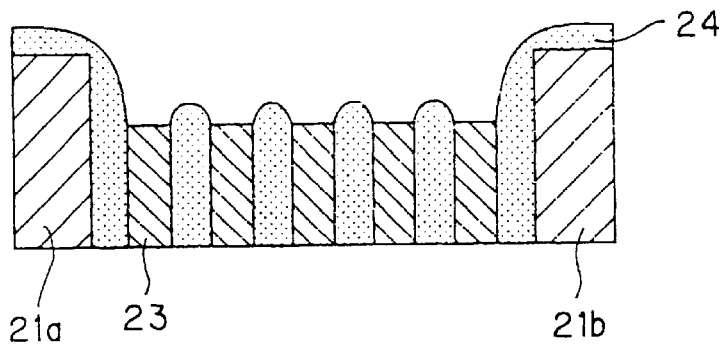
FIG. 8 illustrates a fifth step in the method for manufacturing the recording head 20.

FIG. 8 illustrates a fifth step in the method for manufacturing the recording head 20.

In the fifth step shown in FIG. 8, the photoresist 24_1 that fills the gaps between the turns of the Cu wire constituting the lower coil 23 formed in the first step shown in FIG. 4 and remains after the development in the fourth step shown in FIG. 7 is subjected to a heat treatment at a temperature of about 250° C. to cure the photoresist 24_1, thereby forming the lower photoresist coat layer 24. The fifth step is one example of a resist curing step according to the present invention.

Figure 9:
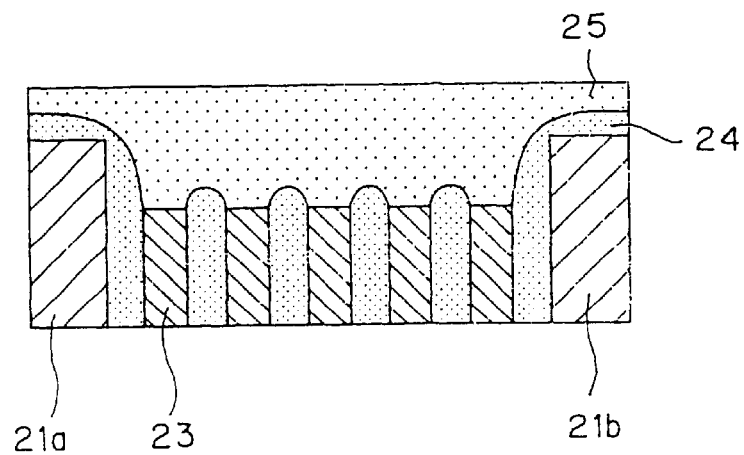
FIG. 9 illustrates a sixth step in the method for manufacturing the recording head 20.

FIG. 9 illustrates a sixth step in the method for manufacturing the recording head 20.

In the sixth step shown in FIG. 9, the lower overcoat layer 25 made of $Al_2O_3$ is formed by sputtering on both the lower photoresist coat layer 24 formed in the fifth step shown in FIG. 8 and the lower coil 23 formed in the first step shown in FIG. 4. The sixth step is one example of an insulating metal compound layer forming step according to the present invention.

With the sixth step, since the lower overcoat layer 25 made of $Al_2O_3$ having a thermal conductivity higher than that of the photoresist 24_1 is formed on Cu wire constituting the lower coil 23, a heat generated in the lower coil 23 is released via the lower overcoat layer 25 in contact with the lower coil 23. Thus, heat generation in the lower coil 23 can be suppressed.

Figure 10:
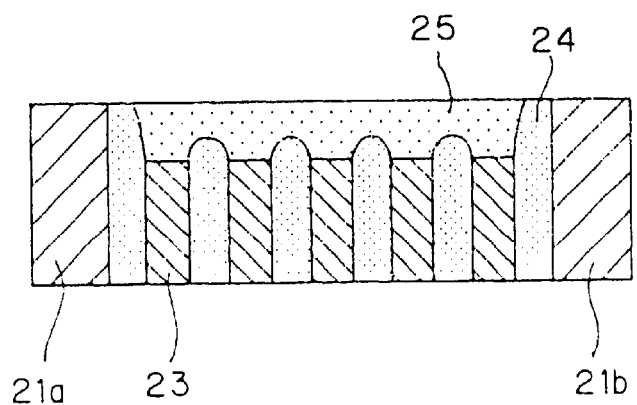
FIG. 10 illustrates a seventh step in the method for manufacturing the recording head 20.

FIG. 10 illustrates a seventh step in the method for manufacturing the recording head 20.

In the seventh step shown in FIG. 10, the lower overcoat layer 25 formed in the sixth step shown in FIG. 9 is polished by chemical and mechanical polishing (CMP) to flatten the lower overcoat layer 25. The seventh step is one example of a polishing step according to the present invention.

With the seventh step, since the lower overcoat layer 25 can be flattened, the recording gap layer 26 (see FIG. 3) with a fine pattern can be formed precisely on the lower overcoat layer 25.

Now, a second embodiment of the method for manufacturing a magnetic head according to the present invention will be described.

The method for manufacturing a magnetic head according to the second embodiment is the same as the method according to the first embodiment except that an eighth step described below with reference to FIG. 1 is inserted between the third step (see FIG. 6) and the fourth step (see FIG. 7) in the method for manufacturing a magnetic head according to the first embodiment described above. Thus, in the following description of the second embodiment, the overlapping description will be omitted.

Figure 11:
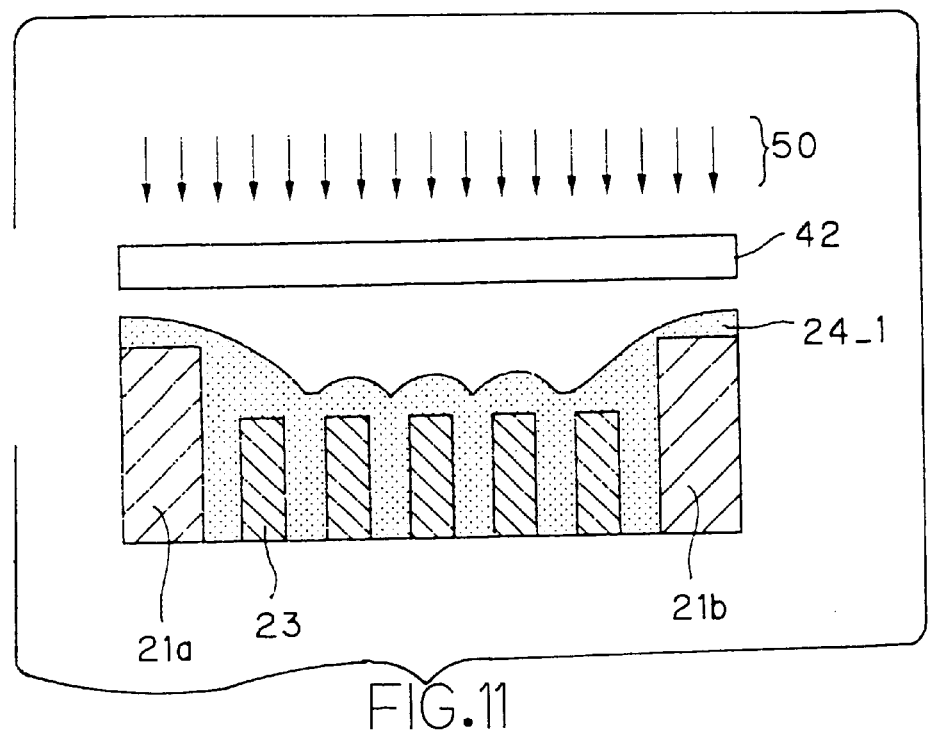
FIG. 11 illustrates an eighth step in the method for manufacturing the recording head 20.

FIG. 11 illustrates the eighth step in the method for manufacturing the recording head 20.

In the eighth step shown in FIG. 11, whole of the photoresist 24_1 applied in the second step shown in FIG. 5 is exposed to ultraviolet rays 50 via a mask 42 for reducing the quantity of the ultraviolet rays, so that the light exposure of the photoresist 24_1 is lower than the light exposure in the third step shown in FIG. 6. The eighth step is one example of a small quantity exposure step according to the present invention.

With the eighth step, the part of photoresist 24_1 which fills the gaps between the turns of the Cu wire constituting the lower coil 23 and is not exposed to the ultraviolet rays in the third step shown in FIG. 6 is exposed to the ultraviolet rays with a low light exposure, and the thickness of the entire photoresist 24_1 is reduced in the fourth step depending on the low light exposure. Thus, the thickness of the lower photoresist coat layer 24 can be brought close to the thickness of the lower coil 23 by adjusting the quantity of the ultraviolet rays for the small quantity exposure. As a result, in the sixth step shown in FIG. 9, the lower overcoat layer 25 made of $Al_2O_3$ can be formed on the lower coil 23 without any void by sputtering with higher reliability, and thus, a magnetic head can be provided in which the heat generated in the lower coil 23 is readily released and heat generation in the lower coil 23 is further suppressed.

In the description of the second embodiment so far, the eighth step is inserted between the third step (see FIG. 6) and the fourth step (see FIG. 7) in the method for manufacturing a magnetic head according to the first embodiment described above. However, the eighth step may be inserted between the second step (see FIG. 5) and the third step (see FIG. 6) in the method for manufacturing a magnetic head according to the first embodiment to attain the same effect.

Now, a third embodiment of the method for manufacturing a magnetic head according to the present invention will be described.

Figure 12:
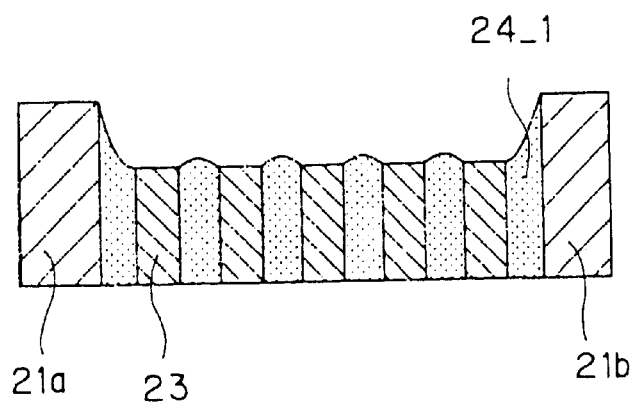
FIG. 12 illustrates a ninth step in the method for manufacturing the recording head 20.

The method for manufacturing a magnetic head according to the third embodiment is the same as the method according to the first embodiment except that a ninth step described below with reference to FIG. 12 is inserted between the fourth step (see FIG. 7) and the fifth step (see FIG. 8) in the method for manufacturing a magnetic head according to the first embodiment described above. Thus, in the following description of the third embodiment, the overlapping description will be omitted.

FIG. 12 illustrates the ninth step in the method for manufacturing the recording head 20.

In the ninth step shown in FIG. 12, the entire surface of the photoresist 24_1 applied in the second step shown in FIG. 5 is subjected to dry-etching. The ninth step is one example of a dry-etching step according to the present invention.

With the method for manufacturing a magnetic head including the ninth step, the thickness of the photoresist 24_1 is reduced depending on the amount of the etching performed on the photoresist 24_1 remaining after the development in the fourth step shown in FIG. 7. Thus, by adjusting the amount of the etching, the thickness of the photoresist 24_1 filling the gaps between the turns of the Cu wire constituting the lower coil 23 can be adjusted and the thickness of the photoresist layer 24_1 can be brought close to the thickness of the lower coil 23. As a result, as in the method for manufacturing a magnetic head including the eighth step described with reference to FIG. 11 according to the second embodiment, the lower overcoat layer 25 can be formed on the lower coil 23 without any void with higher reliability, and a magnetic head with heat generation in the lower coil 23 being further suppressed can be provided.

In the description of the third embodiment so far, the ninth step is inserted between the fourth step (see FIG. 7) and the fifth step (see FIG. 8) in the method for manufacturing a magnetic head according to the first embodiment described above. However, the ninth step may be inserted between the fifth step (see FIG. 8) and the sixth step (see FIG. 9) in the method for manufacturing a magnetic head according to the first embodiment to attain the same effect.

Now, a fourth embodiment of the method for manufacturing a magnetic head according to the present invention will be described.

In the methods for manufacturing a magnetic head according to the first to third embodiment described above, a so-called positive photoresist is used, that is, a part of the photoresist which is exposed to light is removed by development. However, the photoresist used in the method for manufacturing a magnetic head according to the present invention is not limited to the positive photoresist, and a so-called negative photoresist can be used, that is, a part of the photoresist which is not exposed to light can be removed by development.

In the method for manufacturing a magnetic head according to the fourth embodiment described below, the negative photoresist is applied instead of the positive photoresist in the second step shown in FIG. 5.

The method for manufacturing a magnetic head according to the fourth embodiment is the same as the method according to the first embodiment except that the third step shown in FIG. 6 and the fourth step shown in FIG. 7 are replaced with a tenth step shown in FIG. 13 and an eleventh step shown in FIG. 14 described below, respectively. Thus, in the following description of the fourth embodiment, the overlapping description will be omitted.

Figure 13:
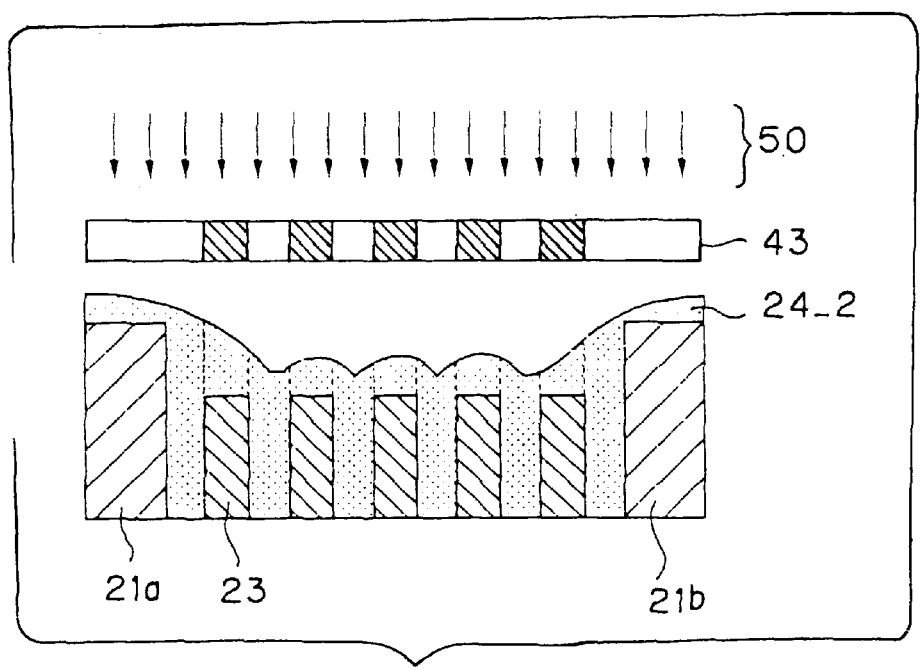
FIG. 13 illustrates a tenth step in the method for manufacturing the recording head 20.

FIG. 13 illustrates the tenth step in the method for manufacturing the recording head 20.

In the tenth step shown in FIG. 13, a negative photoresist 24_2 filling the gaps between the turns of the Cu wire constituting the lower coil 23 is exposed to ultraviolet rays 50 via the mask 43 which is configured to shield against light the negative photoresist 24_2 applied in the second step shown in FIG. 5 except for a part not covering the Cu wire constituting the lower coil 23 formed in the first step shown in FIG. 4.

Figure 14:
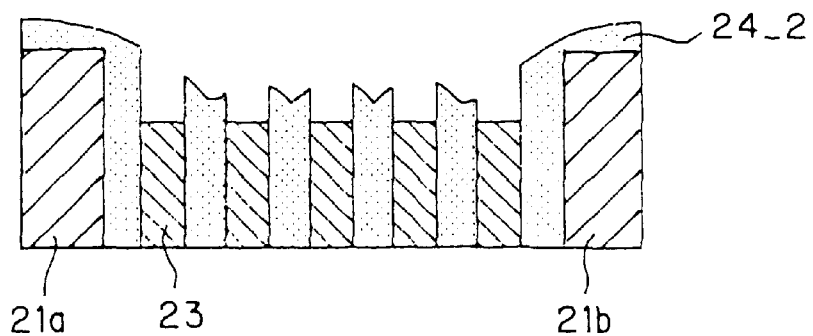
FIG. 14 illustrates an eleventh step in the method for manufacturing the recording head 20.

FIG. 14 illustrates the eleventh step in the method for manufacturing the recording head 20.

In the eleventh step shown in FIG. 14, the negative photoresist 24_2 after exposure in the tenth step shown in FIG. 13 is subjected to development using an alkali solution, thereby removing the part of the negative photoresist 24_2 applied in the second step shown in FIG. 5 which is not exposed to light in the tenth step.

As described with reference to FIGS. 13 and 14, in the method for manufacturing a magnetic head using the negative photoresist, the photoresist covering the Cu wire constituting the lower coil can be surely removed as in the method for manufacturing a magnetic head using the positive photoresist described with reference to FIGS. 6 and 7. Therefore, in the method for manufacturing a magnetic head according to the present invention, either the positive photoresist or negative photoresist can be used.

In the description with reference to FIGS. 2 and 3, the recording head 20 of the combined magnetic head 30 is configured such that the upper coil 27 is covered with the upper photoresist coat layer 28 made of a photoresist. However, the magnetic head manufactured by the method for manufacturing a magnetic head according to the present invention is not limited to such a configuration. For example, in the combined magnetic head 30 shown in FIGS. 2 and 3, the upper coil and the upper photoresist coat layer formed on the recording gap layer 26 of the recording head 20 may be formed by the first to seventh steps in the method for manufacturing a recording head 20 described with reference to FIGS. 4 to 10. Furthermore, if the recording head comprises three or more layers of coils, the above-described first to seventh steps may be used to form each layer of the recording head.

In the following, a configuration of the combined magnetic head composed of the recording head having two layers of coils and the regenerating head, in which each of the layers in the recording head is formed by the first to seventh steps in the method for manufacturing a recording head described with reference to FIGS. 4 to 10, will be described. In the following description, same components as those in the combined magnetic head 30 described with reference to FIGS. 2 and 3 are assigned the same reference numerals, and the overlapping description thereof will be omitted.

Figure 15:
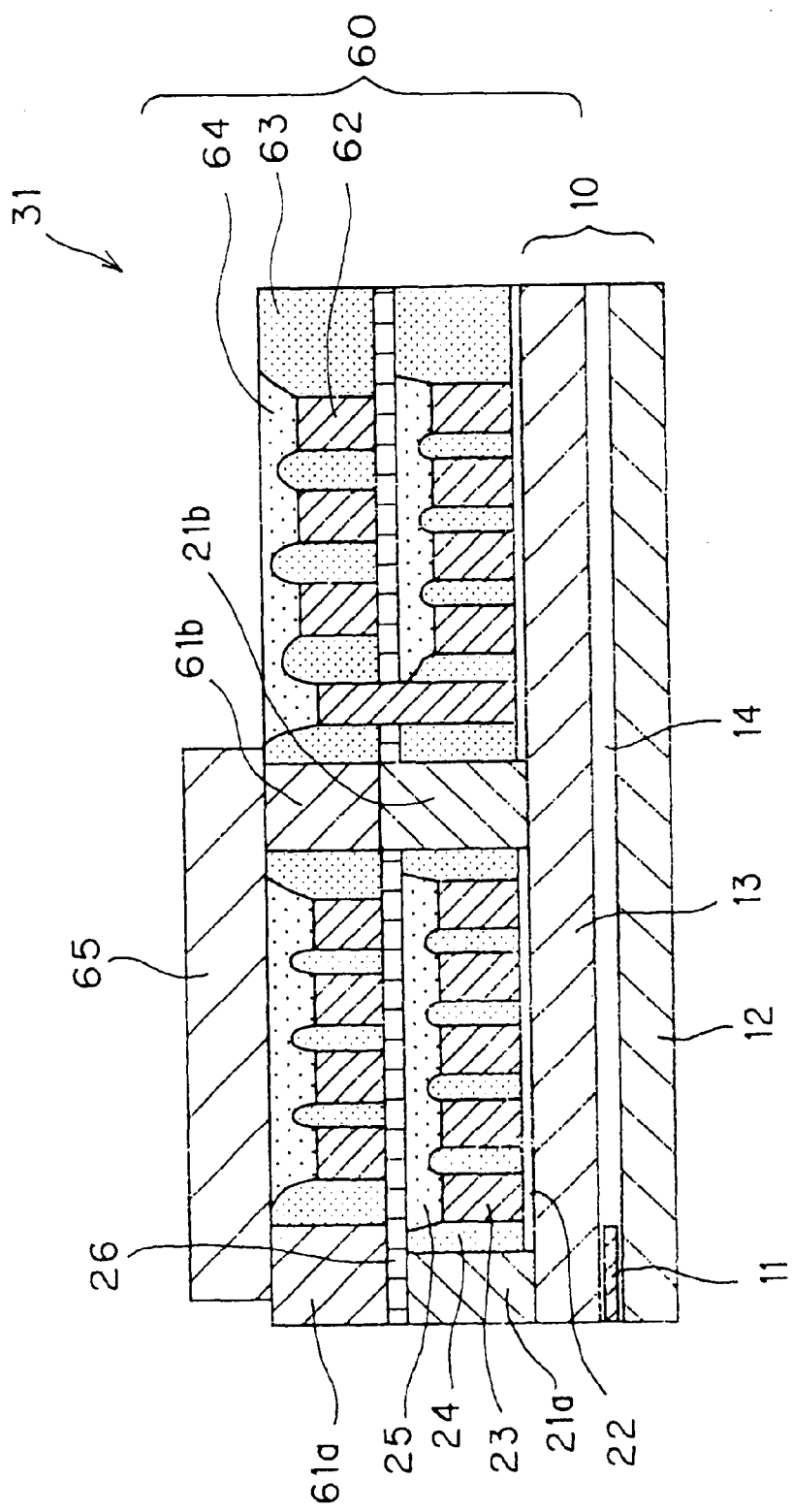
FIG. 15 is a cross-sectional view of the combined magnetic head composed of a recording head having two layers of coils and a regenerating head.
Figure 16:
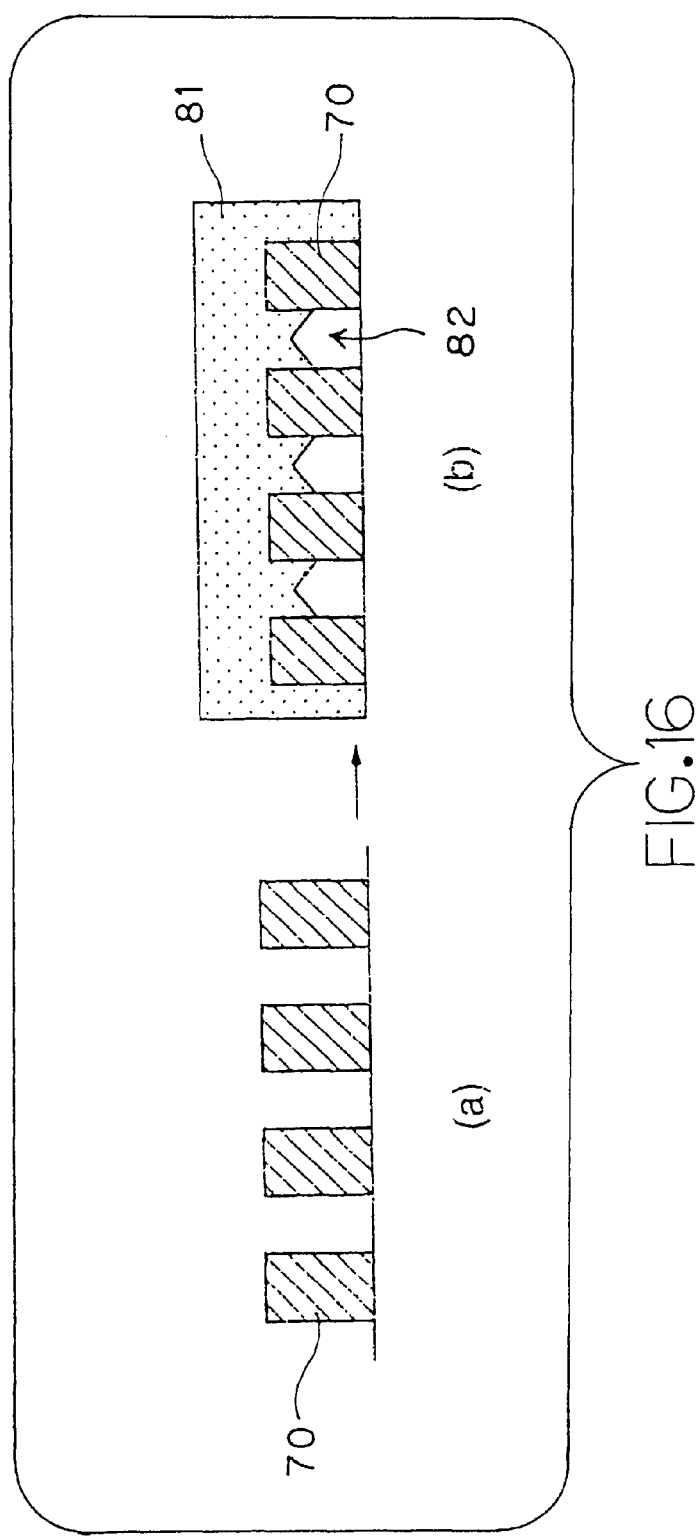
FIG. 16 illustrates a step of forming an overcoat layer made of $Al_2O_3$ on a coil by sputtering.
Figure 17:
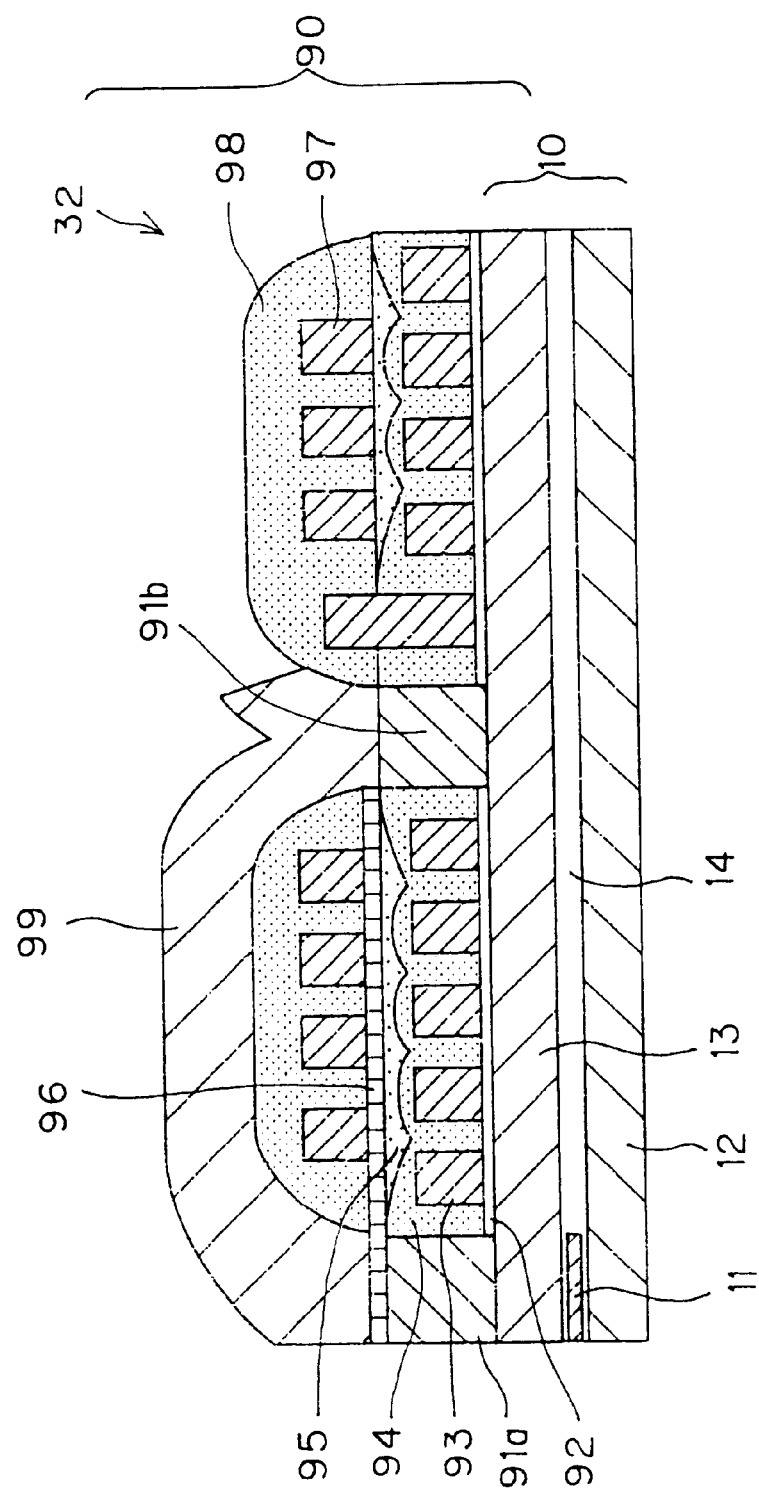
FIG. 17 is a cross-sectional view of a conventional magnetic head having gaps between turns of a conductive material constituting a coil filled with a photoresist.

FIG. 15 is a cross-sectional view of the combined magnetic head composed of the recording head having two layers of coils and the regenerating head.

A recording head 60 of a combined magnetic head 31 shown in FIG. 15, which has two layers of coils, comprises an upper tip secondary magnetic pole 61a and an upper back gap 61b made of NiFe and formed on the recording gap layer 26, an upper coil 62 made of Cu and also formed on the recording gap layer 26, an upper photoresist coat layer 63 made of a photoresist and filling gaps between turns of the Cu wire constituting the upper coil 62, an upper overcoat layer 64 made of $Al_2O_3$ and formed on the upper coil 62 and the upper photoresist coat layer 63, and an upper magnetic pole 65 made of NiFe and formed on the upper overcoat layer 64, the upper tip secondary magnetic pole 61a and the upper back gap 61b.

In the combined magnetic head 31 described with reference to FIG. 15, the gaps between the turns of the Cu wire constituting the upper coil 62 are filled with the photoresist without any void.

In addition, since the upper overcoat layer 64 is formed in intimate contact with the upper coil 62, heat generated in the upper coil 62 is released via the upper overcoat layer 64, and heat generation in the upper coil 62 is suppressed.

In the embodiments described above, the photoresist is exposed to ultraviolet rays in the exposure step according to the present invention. However, the exposure step according to the present invention is not limited to the exposure using ultraviolet rays. For example, an exposure light suitable for characteristics of the photoresist, such as visible rays, electron beam and X ray, can be used.

In the embodiments described above, the photoresist is cured by subjecting the photoresist to a heat treatment in the resist curing step according to the present invention. However, the resist curing step according to the present invention is not limited to curing of the photoresist by heat treatment, and the photoresist may be cured by subjecting the photoresist to a treatment suitable for characteristics thereof, such as an UV (ultraviolet) treatment.

In the embodiments described above, the overcoat layer is formed by sputtering in the insulating metal compound layer forming step according to the present invention. However, the insulating metal compound layer forming step according to the present invention is not limited to the formation of the overcoat layer by sputtering. For example, the overcoat layer may be formed by vapor deposition or the like.

What is claimed is:

1. A method for manufacturing a magnetic head, comprising:
    a coil forming step of forming a spiral coil made of a conductive material on a predetermined plane;
    a resist applying step of applying a photoresist to all of the coil formed in said coil forming step to fill a gap between turns of a conductive material constituting the coil with the photoresist;
    an exposure step of exposing to light a part of the photoresist applied in said resist applying step which covers the conductive material constituting the coil formed in said coil forming step;
    a development step of subjecting the photoresist exposed to light in said exposure step to development to remove the part of the photoresist applied in said resist applying step which is exposed to light in said exposure step;

a resist curing step of curing the photoresist remaining after the development in said development step; and an insulating metal compound layer forming step of forming an insulating metal compound layer made of an insulating material containing a metal element on the photoresist cured in said resist curing step and the coil formed in said coil forming step.

2. The method for manufacturing a magnetic head according to claim 1, wherein said exposure step is to expose to light a part of the photoresist applied in said resist applying step which fills the gap between the turns of the conductive material constituting the coil formed in said coil forming step, instead of to expose to light the part of the photoresist applied in the resist applying step which covers the conductive material constituting the coil, and said development step is to remove a part of the photoresist applied in said resist applying step except for the part of the photoresist exposed to light in said exposure step, instead of to remove the part of the photoresist applied in the resist applying step which is exposed to light in the exposure step.

3. The method for manufacturing a magnetic head according to claim 1, further comprising a small quantity exposure step before or after said exposure step, in which all of the photoresist applied in said resist applying step is exposed to light with a light exposure lower than that in the exposure step.

4. The method for manufacturing a magnetic head according to claim 1, further comprising a dry-etching step before or after said resist curing step, in which all of the photoresist applied in said resist applying step is subjected to dry-etching.

5. The method for manufacturing a magnetic head according to claim 1, further comprising a polishing step of polishing the insulating metal compound layer formed in said insulating metal compound layer forming step.

* * * * *